T. D. KELLOGG.
Refrigerator.
No. 84,196.
Patented Nov. 17, 1868.
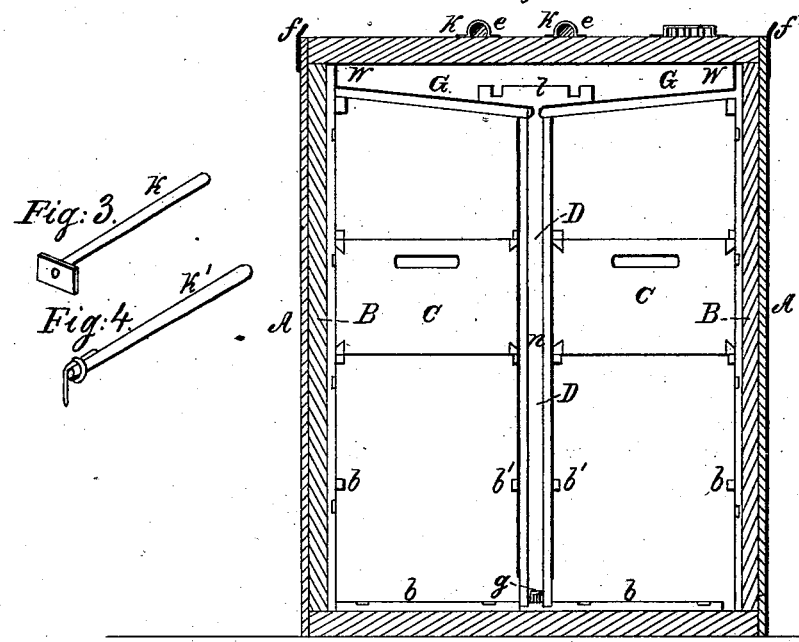
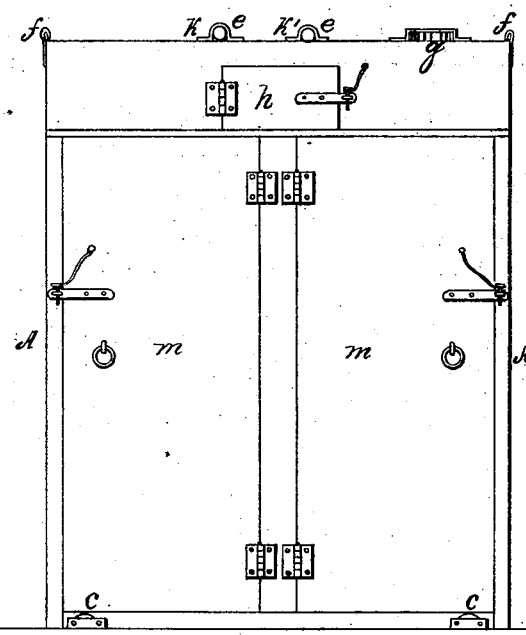

THEODORE DWIGHT KELLOGG, OF NEW YORK, N. Y.

Letters Patent No. 84,196, dated November 17, 1868.

IMPROVED REFRIGERATOR.

The Schedule referred to in these Letters Patent and making part of the same.

*To all whom it may concern:*

Be it known that I, THEODORE DWIGHT KELLOGG, of the city of New York, in the county of New York, and State of New York, have invented certain new and useful Improvements in the Method of Preserving Fish, Bait for Fishing-Vessels, Poultry, Game, &c.; and I do hereby declare that the following is a full, clear, and exact description thereof, reference being had to the accompanying drawings, and to the letters of reference marked thereon, which form a part of this specification, and in which—

Figure 1 represents a vertical central section, and

Figure 2, a front view of my improved meat and fish-preserver.

Figure 3 is a perspective view of the ice-rammer, and

Figure 4, a similar view of the ice-rake.

The nature of my invention consists in making certain improvements on my patent for a meat, fish, and game-preserver, which Letters Patent bear date February 11, 1868, No. 74,378, and by which a thorough ventilation of the preserver is obtained, allowing currents of air to pass through its bottom, centre, and upper portions, for the purpose hereinafter to be set forth.

To enable others to make and employ my invention, I will now describe it.

In the accompanying drawings, A represents the casing or outer portion of my preserver, made in any desired shape or size, and to this casing or wall is secured an inner wall or lining, B.

Secured to the inner sides of lining B and the floor of the preserver, are strips, across which are fastened metal and wooden strips, $b\ b$. The wooden strips, which are secured to the lining B, are designed to support one side of the perforated meat or fish-boxes or drawers, C C, the opposite side of said boxes being supported by similar strips, $b'\ b'$, secured to the partition D.

The object of the strips $b\ b$ is to permit the air to pass up around the meat-boxes C C, and up through the partition D, it being admitted through openings in the bottom of the preserver, said openings communicating with the openings $c\ c$, partially covered, and situated in the front lower end of preserver A.

D represents a partition placed in the centre of A, and consisting of two walls placed a suitable distance apart, thus forming a chamber, $n$, for ice.

In the lower part of the chamber of partition D is inserted a slatted frame, $g$, for the ice in said chamber to rest on, and to allow air to pass from beneath strips $b\ b$ up into the ice.

G G designate two inner roofs or pieces, secured, at their lower ends, to the upper part of each of the walls of partition D, and having their opposite ends resting on strips secured to the lining B of casing A. The roofs or pieces G G do not come in contact with the lining B, but are bent upwards at the point where they are secured, and made to extend within a short distance of the top of casing A, so as to leave a space between them and the lining B sufficiently wide to permit a good current of air to pass through said space and enter the chamber of the preserver, into which the meat or fish-boxes C C are placed.

The space unoccupied by the upper portions of the pieces G G is covered with wire cloth, W, secured to pieces G and strips attached to lining B, for the purpose of allowing air from the ice-chamber $l$, above the inclined pieces G, to enter the space between said pieces and lining B.

$h$ is a door for introducing ice into chamber $l$.

$m\ m$ are also doors, secured or hinged to the front part of casing A, and through which access is had to the perforated pans or boxes C C, into which meat, fish, and game are placed to be preserved.

Secured to the sides of casing A, at its top, are clips, $f\ f$, for lowering or hoisting the preserver in and out of such places where the case requires it.

$k$ is the rammer or packer, for packing the ice in the preserver, and $k'$ is the ice-rake or breaker.

The top of the preserver or casing A is furnished with suitable receptacles, $e\ e$, for receiving or holding the packer and rammer when not in use.

The operation of my invention is as follows:

The ice is introduced into the chamber $l$, and the cold air from the ice descends through the ice in the chamber, between the walls of partition D, and intermingles with the air in the lower part of the preserver, which is admitted through the openings $c\ c$, and thereby becomes somewhat warm, and then ascends up through the perforations in the meat-boxes C C, and around the same, and through the wire cloth W, thus keeping up a constant circulation of air throughout the preserver, insuring the preservation of the meat or bait in the boxes C C.

Having thus described my invention,

What I claim, and desire to secure by Letters Patent, is—

The combination of the casing A, lining B, ice-chamber G $n$, grating $g$, strips $b\ b$, $b'\ b'$, openings $c\ c$, boxes C C, and wire cloth, W W, all constructed, arranged, and operated in the manner and for the purpose set forth.

In testimony that I claim the foregoing as my own, I affix my signature in presence of two witnesses.

THEODORE D. KELLOGG.

Witnesses:
JOHN Q. KELLOGG,
W. R. WINNIK.